(12) United States Patent
Chen

(10) Patent No.: US 6,462,854 B1
(45) Date of Patent: Oct. 8, 2002

(54) CHANGING THE POSITIONS OF LENSES BY WAY OF MOVEMENT OF OPTICAL MODULE

(75) Inventor: Chih Ming Chen, Yung-Ho (TW)

(73) Assignee: Acer Peripherals, Inc., Taoyuan (TW)

( * ) Notice: Subject to any disclaimer, the term of this patent is extended or adjusted under 35 U.S.C. 154(b) by 0 days.

(21) Appl. No.: 09/470,521

(22) Filed: Dec. 22, 1999

(30) Foreign Application Priority Data

Jan. 6, 1999 (TW) ...................................... 88200137 U

(51) Int. Cl.[7] .............................................. G02B 26/08
(52) U.S. Cl. ........................................ 359/210; 359/821
(58) Field of Search ................................ 359/210, 821, 359/822, 819; 347/256–258

(56) References Cited

U.S. PATENT DOCUMENTS

| 5,535,040 A | 7/1996 | Ohtsuka et al. |
| 5,552,939 A | 9/1996 | Tseng et al. |

*Primary Examiner*—James Phan
(74) *Attorney, Agent, or Firm*—Ladas & Parry

(57) ABSTRACT

A scanner has a base, at least one guiding member and an optical module. The base has a changing zone. The guiding member is connected onto the base. The optical module has a movable lens mount, a swing mechanism rotatably connected to the lens mount, a first lens provided on the lens mount and a second lens also provided on the lens mount. When the optical module moves into the changing zone of the base, the swing mechanism is pushed by the guiding member and then rotates so that the lens mount connected to the swing mechanism begins to move until one of the first and second lens provided on the lens mount moves to a predetermined position for use.

16 Claims, 8 Drawing Sheets

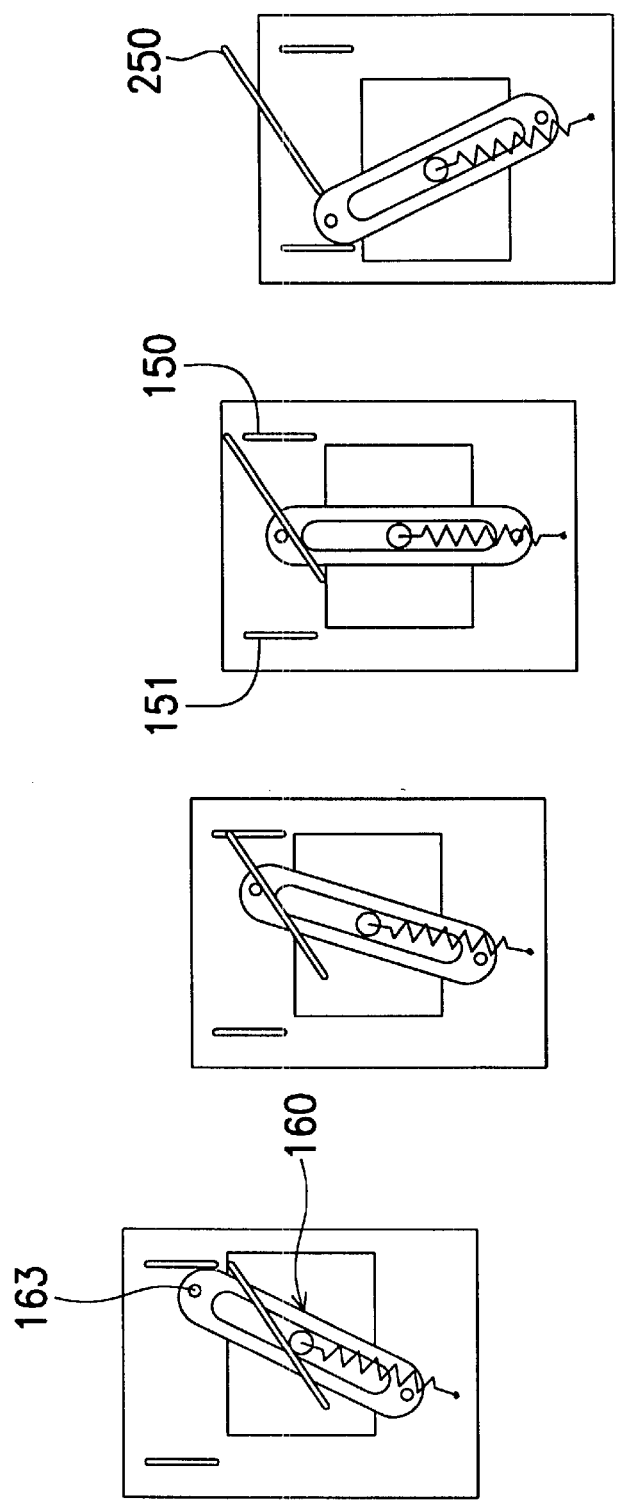

CHANGING THE POSITIONS OF LENSES BY WAY OF MOVEMENT OF OPTICAL MODULE

BACKGROUND OF THE INVENTION

1. Field of the Invention

The present invention relates in general to an economical scanner in which changing the positions of lenses is performed by way of the movement of an optical module rather than an additional driving mechanism.

2. Description of the Related Art

A scanner provided with two lenses has been published. The resolutions of the two lenses are different so that the user can choose to use one of the lenses. Generally speaking, a lens of high resolution can provide a good scanning quality, but also provides a lower scanning speed and a smaller scanning zone. On the other hand, a lens of low resolution can provide a better scanning speed and a larger scanning zone. However, the scanning quality is poor. In brief, the choice of the lenses depends on the user's desire for the scanning quality or scanning speed.

The related arts include U.S. Pat. Nos. 5,535,040 and 5,552,939, in both of which a driving mechanism is additionally provided for changing the positions of the lenses for use. It is known that a scanner already has a driving mechanism for driving an optical module to scan documents. However, a scanner of the related art necessarily includes another driving mechanism to change the positions of the lenses for use. That obviously costs more and thus is not economical.

SUMMARY OF THE INVENTION

An object of the present invention is to provide an economic scanner which requires only one driving mechanism for both driving an optical module along a scanning path for scanning a document and changing the lenses for use.

The scanner of the present invention has a base, at least one guiding member and an optical module. The base has a changing zone. The guiding member is connected onto the base. The optical module has a movable lens mount, a swing'mechanism rotatably connected to the lens mount, a first lens provided on the lens mount and a second lens also provided on the lens mount. When the optical module moves into the changing zone of the base, the swing mechanism is pushed by the guiding member and then rotates so that the lens mount connected to the swing mechanism begins to move until one of the first or second lenses& provided on the lens mount moves to a predetermined position for use.

It is therefore understood that changing the positions of the first and second lenses is performed by way of the movement of the optical module rather than an additional driving mechanism.

BRIEF DESCRIPTION OF THE DRAWINGS

The present invention can be more fully understood by reading the subsequent detailed description and examples with references made to the accompanying drawings, wherein:

FIGS. 6A–6D depict step by step how to change the positions of lenses in the second changing zone of the base of a scanner.

DETAILED DESCRIPTION OF THE PREFERRED EMBODIMENT

Figure 1A:
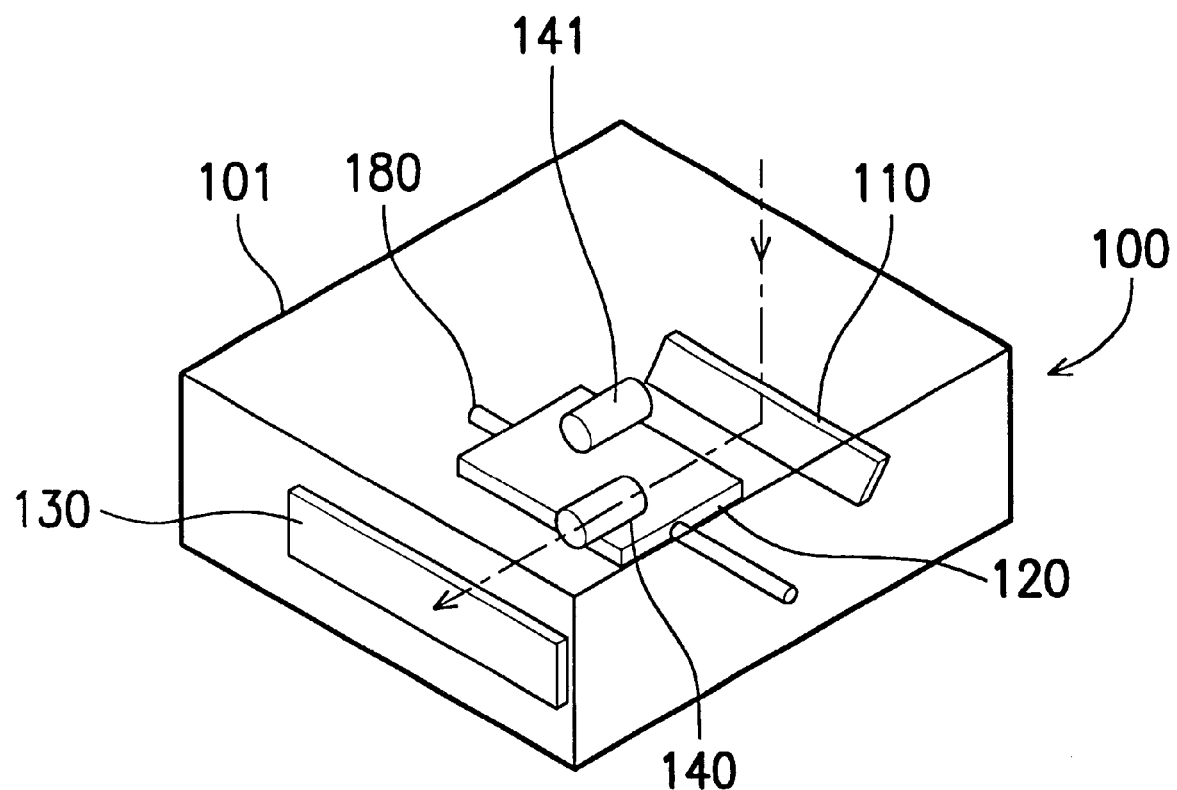
FIG. 1A is a schematic diagram of an optical module of a scanner in accordance with the present invention, wherein a first lens is in use.
Figure 1B:
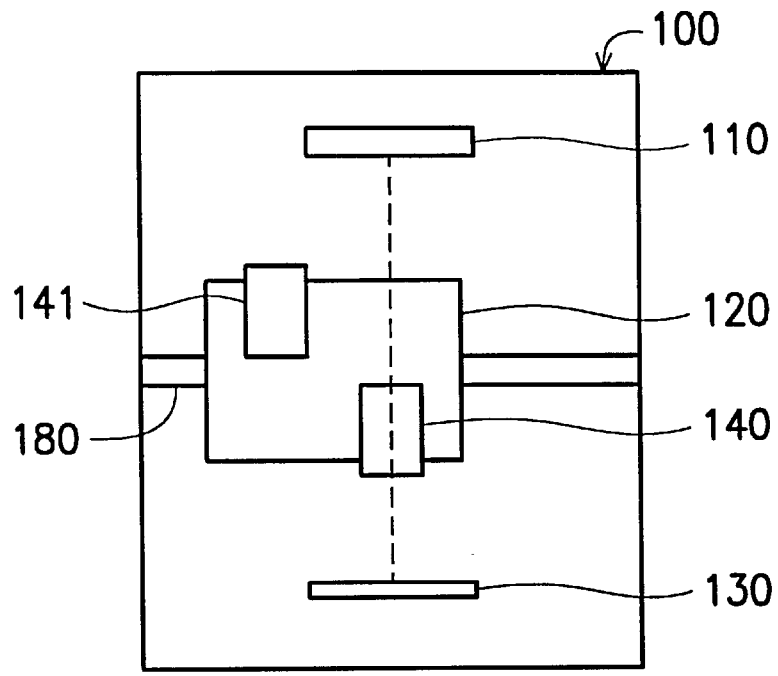
FIG. 1B is a top view of FIG. 1A.
Figure 2A:
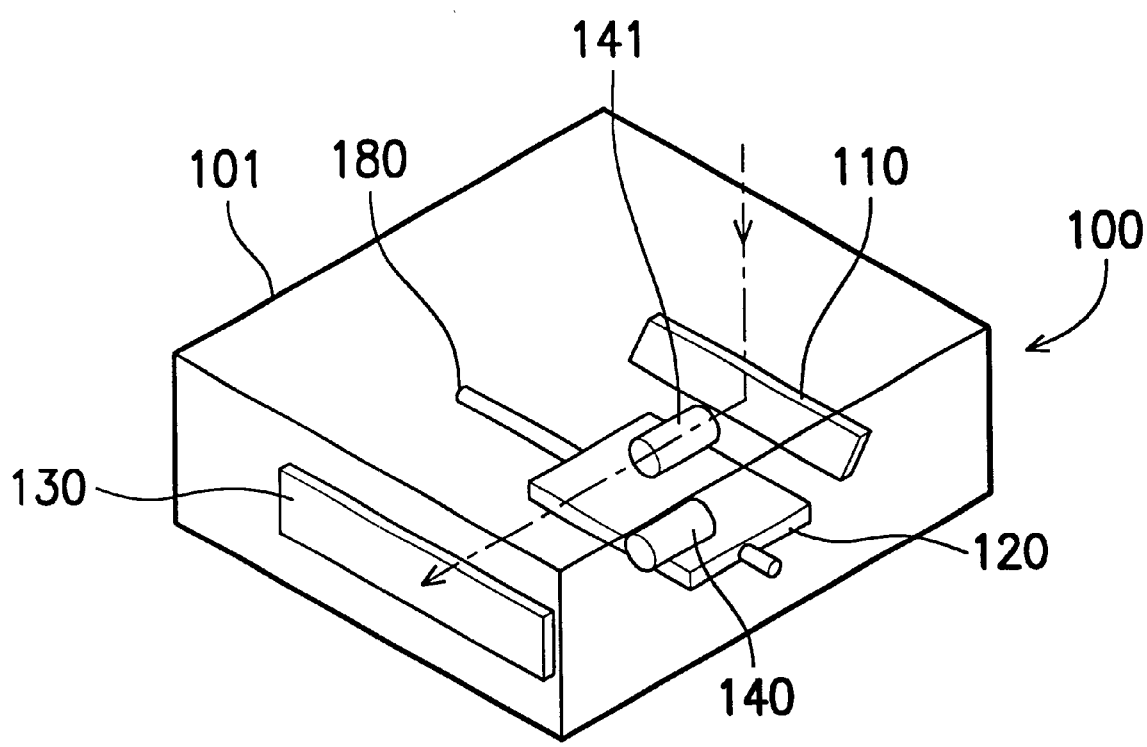
FIG. 2A a schematic diagram of an optical module of a scanner in accordance with the present invention, wherein a second lens is in use.

Referring to FIGS. 1A and 1B, an optical module 100 of the present invention has a housing 101, in which a first lens, 140 and a second lens 141 of different resolutions are provided on a lens mount 120. The lens mount 120 is allowed to slide on a bar 180 so as to change the positions of the first and second lenses 140, 141 for use. It is noted that the positions of the lenses 140, 141 shown in FIGS. 1A and 2A are different. In FIG. 1A, the light from the scanned document is reflected by at least one mirror 110 through the first lens 140 to focus on a charge-coupled device (CCD) 130. In FIG. 2A, the light from the scanned document is reflected by the mirror 110 through the second lens 141 to focus on the charge-coupled device (CCD) 130.

Figure 1C:
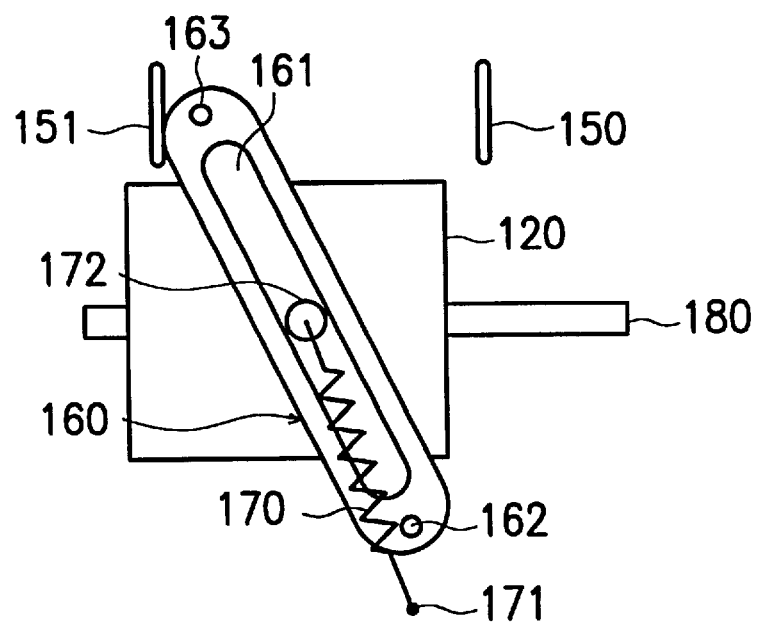
FIG. 1C is a bottom view of FIG. 1A.
Figure 2B:
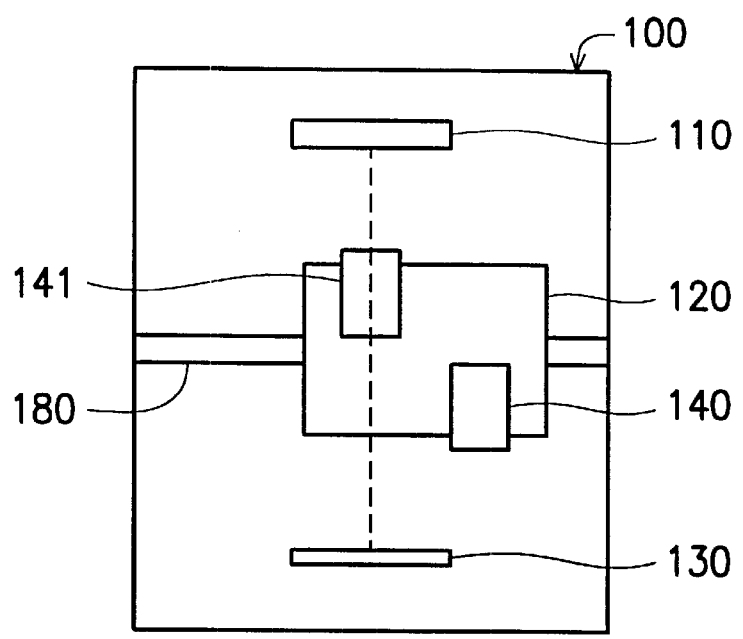
FIG. 2B is a top view of FIG. 2A.
Figure 2C:
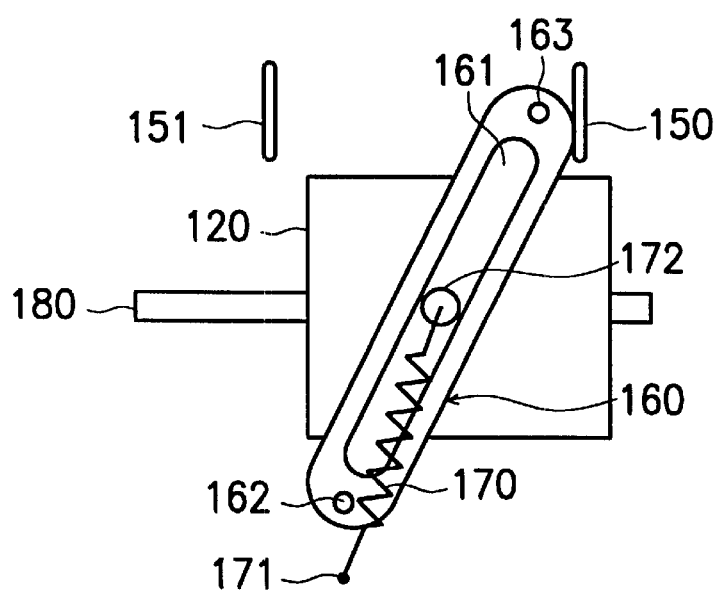
FIG. 2C is a bottom view of FIG. 2A.

Now the mechanism for changing the positions of the two lenses 140, 141 is described. FIG. 1C is a bottom view of FIG. 1A, wherein a swing arm 160 and a spring 170 are provided under the lens mount 120. An end of the swing arm 160 is pivoted on the bottom of the optical module 100 via a pivot 162. Thus, the swing arm 160 can rotate with respect to the optical module 100 via the pivot 162. A post 163 is connected to the other end of the swing arm 160. A slot 161 is provided on the swing arm 160. Furthermore, an end 171 of the spring 170 is connected to the bottom of the optical module 100, while the other end of the spring 170 is connected to the lens mount 120 via a connecting pin 172 provided in the slot 161. Furthermore, two ribs 150, 151 are provided on the bottom of the optical module 100. When the lens mount 120 rests at the position shown in FIGS. 1A and 1B, the swing arm 160 is inclined against the rib 151 as shown in FIG. 1C. However, when the lens mount 120 rests at the position shown in FIGS. 2A and 2B, the swing arm 160 is inclined against the other rib 150 as shown in FIG. 2C.

Figure 3:
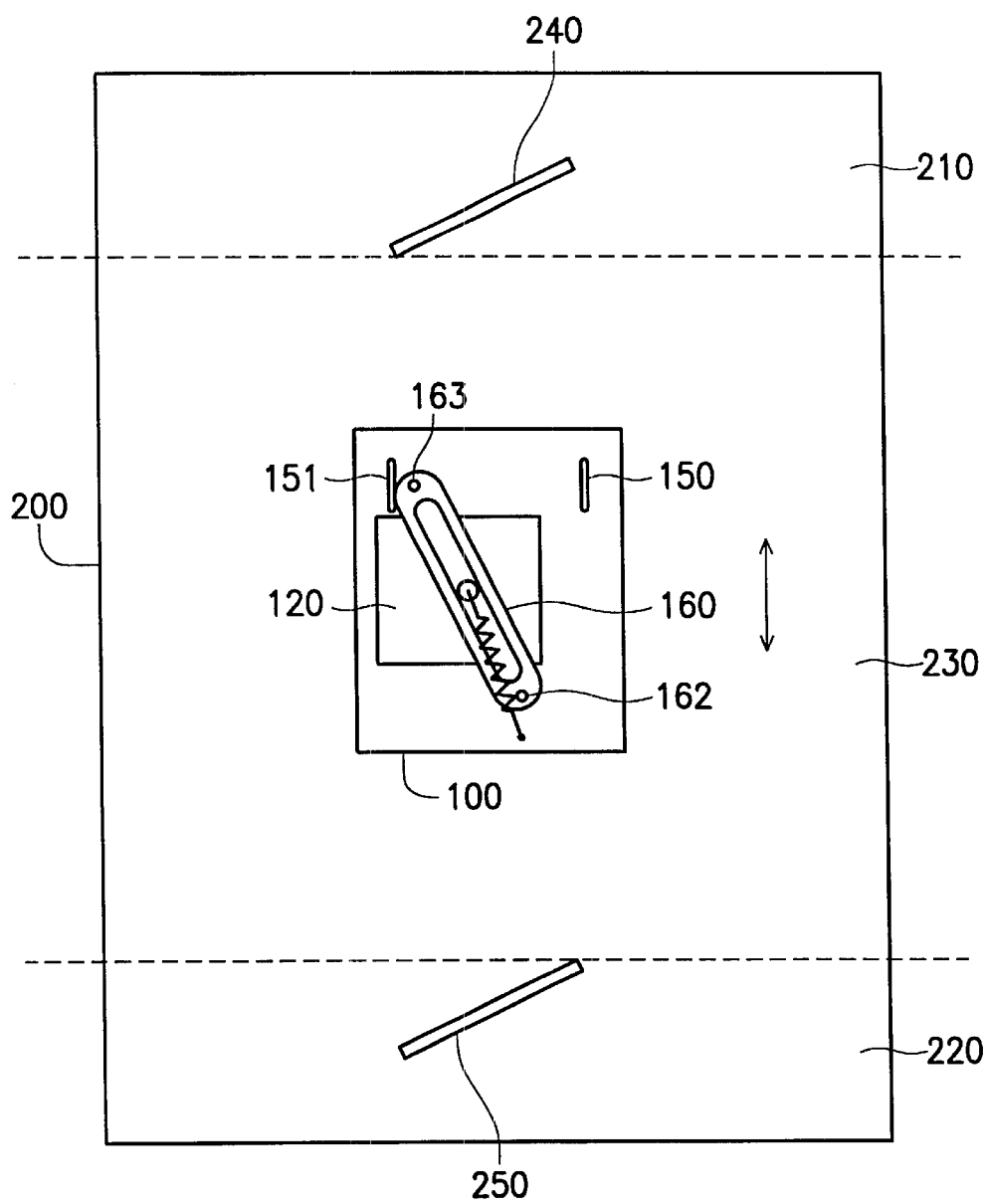
FIG. 3 is a bottom view of the base of a scanner in which the positions of the lenses are consistent with those shown in FIGS. 1A–1C.

Now the operation of changing the positions of the lenses is described. FIG. 3 is a bottom view of the base of a scanner in which the positions of the lenses are consistent with those shown in FIGS. 1A–1C. The base 200 includes a scanning zone 230, a first changing zone 210 and a second changing zone 220. While scanning documents, the optical module 100 moves along a scanning path in the scanning zone 230 in the directions as indicated by the arrows. However, if necessary, the optical module 100 moves further into either the changing zones 210 or the changing zone 220 so as to change the positions of the lenses by using guiding members 240, 250 fixed on the base 200.

Figure 4D:
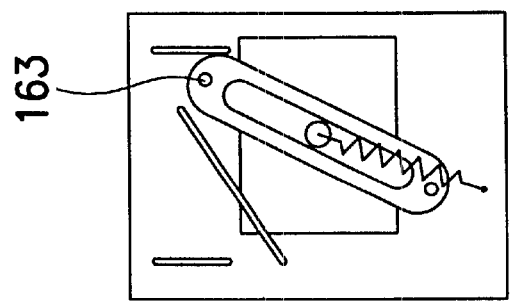
FIGS. 4–4D depict step by step how to change the positions of lenses in a first changing zone of the base of a scanner.
Figure 4C:
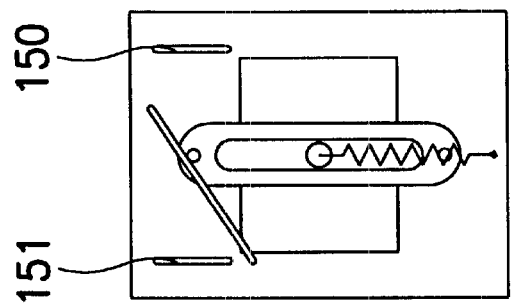
Figure 4B:
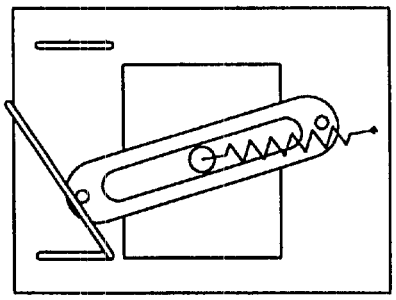
Figure 4A:
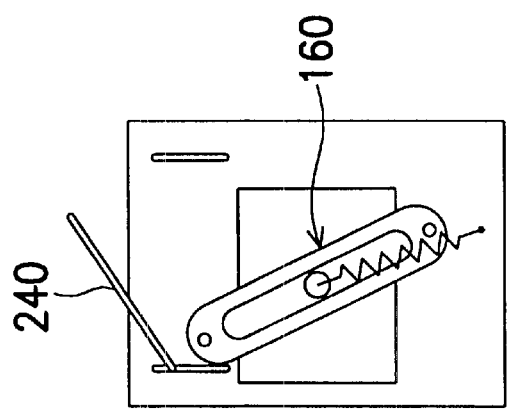
Figure 5:
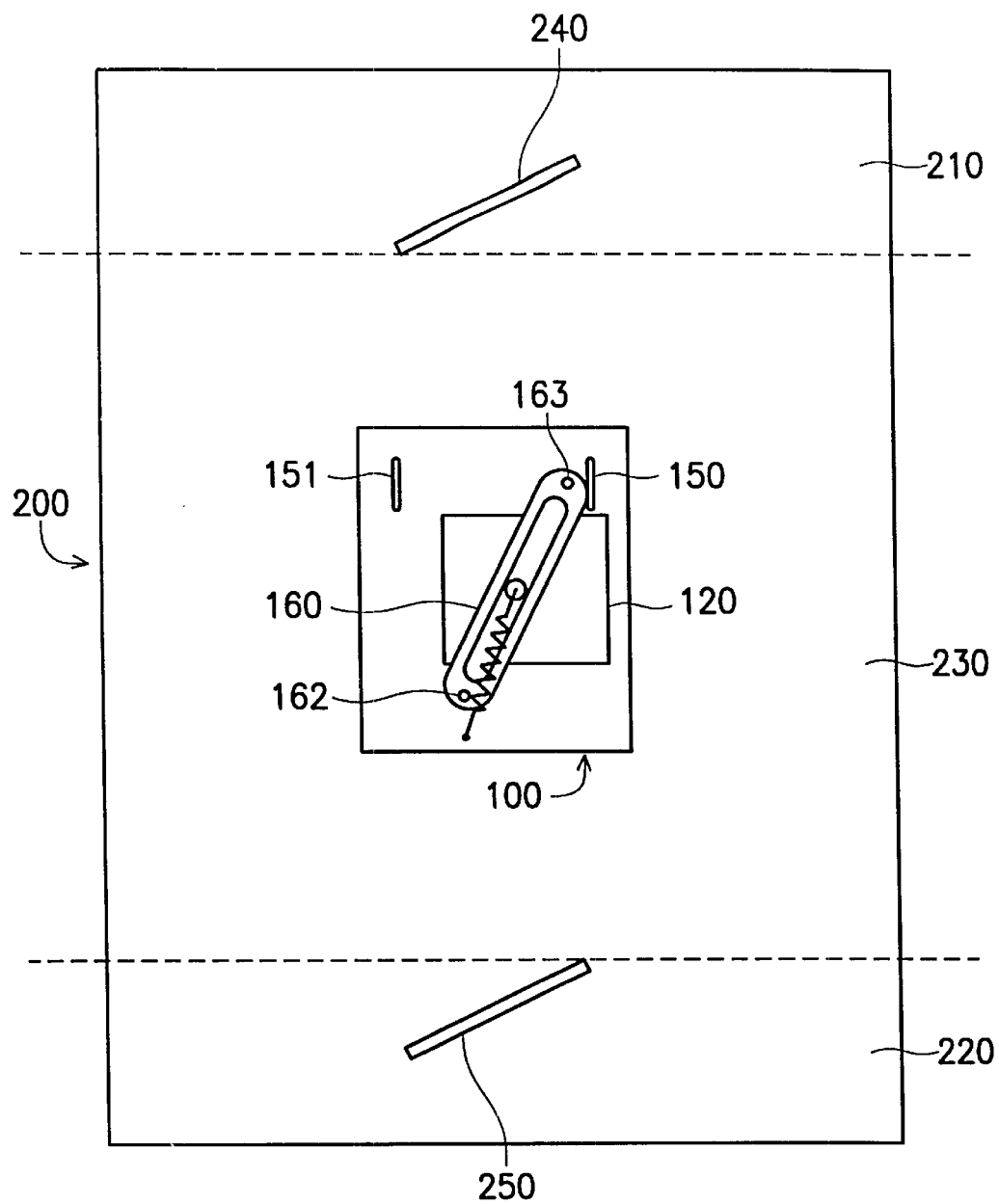
FIG. 5 is a bottom view of the base of a scanner in which the positions of the lenses are consistent with those shown in FIGS. 2A–2C.

FIGS. 4A–4D depict step by step how to change the lenses in the first changing zone 210. During the movement of the optical module 100, the post 163 of the swing arm 160 comes into contact with the guiding member 240. Then, the post 163 is pushed by the guiding member 240 so that the swing arm 160 begins to rotate and the spring 170 is stretched. In FIG. 4C, the spring 170 is stretched to its longest extension. The post 163 is continuously pushed by the guiding member 240. Under the restoring action of the spring 170, the swing arm 160 rotates toward the rib 150 and then rests on the rib 150. The changing operation is finished, and the result is as shown in FIG. 5.

If it is desired to change back the positions of the lenses, the optical module 100 moves into the second changing zone 220. FIGS. 6A–6D depict step by step how to change the positions of the lenses in the second changing zone 220. This operation is very similar to the previous one. FIGS. 6A–6C show the stretching process of the spring 170, and FIGS. 6C–6D show the restoring process of the spring 170. Under the restoring action of the spring 170, the swing arm 160 rotates toward the rib 151 and then rests on the rib 151.

The above embodiment is illustrated for a scanner using a CCD (charge-coupled device) optical module. However, it should be noted that the present invention could also apply to a scanner using a CIS (contact image sensor) optical module, or other image sensing device optical module.

From the description above, it is understood that the present invention does not require additional driving mechanism. Rather, changing the positions of the first and second lenses is performed by way of the movement of the optical module. Therefore, a scanner of the present invention is less expensive than that of the prior art.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A scanner comprising:
   a base having a changing zone;
   at least one guiding member connected onto the base;
   an optical module having a movable lens mount, a swing mechanism connected to the lens mount, a first lens provided on the lens mount, and a second lens also provided on the lens mount;
   when the optical module moves into the changing zone of the base, the swing mechanism is pushed by the guiding member so that the lens mount connected to the swing mechanism begins to move until one of the first and second lens provided on the lens mount moves to a predetermined position for use.

2. A scanner as claimed in claim 1, wherein the optical module further has a housing in which the lens mount, the swing mechanism, the first lens and the second lens are received.

3. A scanner as claimed in claim 2, the optical module further comprising two ribs, on one of which the swing mechanism rests when one of the first and second lenses moves to the predetermined position for use.

4. A scanner as claimed in claim 3, wherein the swing mechanism comprises a swing arm on which a slot is provided, a pin provided in the slot and connected to the lens mount, and a spring connecting the housing and the pin.

5. A scanner as claimed in claim 4, wherein the swing arm is pivoted onto the housing of the optical module.

6. A scanner as claimed in claim 4, wherein the swing arm has a post which is pushed by the guiding member when the optical module moves into the changing zone of the base, so that the swing arm rotates and the lens mount begins to move until one of the first and second lens provided on the lens mount moves to a predetermined position for use.

7. A scanner as claimed in claim 2, wherein the optical module further has a bar fixed to the housing, and the lens mount is movably supported by the bar.

8. A scanner as claimed in claim 1, wherein the optical module is moved into the changing zone along a same direction that a document is scanned.

9. An image reading apparatus for reading an image on an object, comprising:
   a base having a changing zone;
   a first activation device connected onto the base;
   an optical module for receiving the image on the object, the optical module having a second activation device, an elastic device, a first lens and a second lens;
   wherein when the optical module moves into the changing zone, the second activation device is activated by the first activation device, the first lens and the second lens change their positions and the elastic device forces at least one of the first lens and the second lens to move to a predetermined position for use.

10. An image reading apparatus as claimed in claim 9, wherein the first activation device is a guiding member fixed connected onto the base.

11. An image reading apparatus as claimed in claim 10, wherein the second activation device is a swing mechanism rotatably connected to the optical module.

12. An image reading apparatus as claimed in claim 11, the optical module further comprising two ribs, on one of which the swing mechanism rests when one of the first and second lenses moves to a predetermined position.

13. An image reading apparatus for as claimed in claim 9, wherein the base has a scanning zone and the optical module moves along a scanning path in the scanning zone to receive the image, and when the optical module moves from the scanning zone into the changing zone of the base, the positions of the first lens and the second lens are interchanged.

14. An image reading apparatus for reading an image on an object, comprising:
   a base having a changing zone;
   a member connected onto the base;
   an optical module for receiving the image on the object, the optical module having an interchanging device, two ribs, a first lens and a second lens, the interchanging device comprising a swing mechanism rotatably connected to the optical module;
   wherein the optical module may move along a scanning path for scanning a document, and by moving further on the scanning path, the optical module may move into the changing zone of the base, which activates the interchanging device, by contact with the member, lo interchange the positions of the first lens and the second lens, the swing mechanism resting on one of the ribs when one of the first and second lenses moves to a predetermined position.

15. A method for interchanging lenses in an image reading apparatus, said method comprising the steps of:
   providing a base of the image reading apparatus, the base having a changing zone and a first activation device;
   providing an optical module for receiving an image, the optical module having a second activation device, two ribs, a first lens, and a second lens, wherein the second activation device is a swinging mechanism rotatably connected to the optical module;

moving the optical module toward the first activation device in the changing zone; and activating the second activation device with the first activation device so that the positions of the first lens and the second lens are interchanged, wherein the swing mechanism rests on one of the two ribs when the first or second lens moves to a predetermined position.

16. The method according to claim 15, wherein the first activation device is a guiding member fixedly connected onto the base.

* * * * *